United States Patent [19]
Matsuo et al.

[11] Patent Number: 5,524,668
[45] Date of Patent: Jun. 11, 1996

[54] HOT AND COLD WATER MIXING DEVICE

[75] Inventors: Nobusuke Matsuo; Masakazu Kogo; Yoshinori Sagara, all of Kitakyushu, Japan

[73] Assignee: Toto Ltd., Fukuoka-ken, Japan

[21] Appl. No.: 347,364

[22] PCT Filed: Apr. 5, 1994

[86] PCT No.: PCT/JP94/00565

§ 371 Date: Dec. 2, 1994

§ 102(e) Date: Dec. 2, 1994

[87] PCT Pub. No.: WO94/23229

PCT Pub. Date: Oct. 13, 1994

[30] Foreign Application Priority Data

| Apr. 5, 1993 | [JP] | Japan | 5-103541 |
| Apr. 13, 1993 | [JP] | Japan | 5-110952 |
| Apr. 28, 1993 | [JP] | Japan | 5-125068 |
| Apr. 28, 1993 | [JP] | Japan | 5-125069 |

[51] Int. Cl.⁶ ............................ F16K 27/00; F16K 11/07
[52] U.S. Cl. .................... 137/375; 137/454.2; 137/606
[58] Field of Search ................ 137/454.2, 454.5, 137/606, 607, 375

[56] References Cited

U.S. PATENT DOCUMENTS

| 3,420,262 | 1/1969 | O'Neill | 137/375 |
| 3,520,325 | 7/1970 | Stuart | 137/375 |
| 3,575,208 | 4/1971 | Urban | 137/606 |
| 3,964,507 | 6/1976 | Jandrasi et al. | 137/375 |
| 4,381,073 | 4/1983 | Gloor | 137/606 X |
| 4,610,393 | 9/1986 | Rodriquez | 137/607 X |
| 5,344,067 | 9/1994 | Axelsson et al. | 137/607 X |

FOREIGN PATENT DOCUMENTS

| 49-150423 | 12/1974 | Japan . |
| 55-119470 | 8/1980 | Japan . |
| 56-24147 | 6/1981 | Japan . |
| 56-26132 | 6/1981 | Japan . |
| 57-101170 | 6/1982 | Japan . |
| 58-40060 | 9/1983 | Japan . |
| 61-50194 | 11/1986 | Japan . |
| 64-3880 | 2/1989 | Japan . |
| 1-261576 | 10/1989 | Japan . |
| 1-165384 | 11/1989 | Japan . |
| 3-55971 | 5/1991 | Japan . |

OTHER PUBLICATIONS

International Search Report dated Jun. 07, 1994 for International Application No. PCT/JP94/00565.

Primary Examiner—Stephen M. Hepperle
Attorney, Agent, or Firm—Finnegan, Henderson, Farabow, Garrett & Dunner

[57] ABSTRACT

A hot and cold water mixing device comprises an outercasing having openings 51, 52, 170a and 180a which communicate with a hot water supply passage, a cold water supply passage and a mixed water delivery passage, respectively, and a hollow inner casing 60 formed with two primary water holes communicating with the hot water supply passage and the cold water supply passage, respectively, and with a secondary water hole communicating with the mixed water delivery passage, said primary and secondary water holes being penetrated from the outer surface of the inner casing. The inner casing 60 is inserted into the outer casing 50 with a gap remaining radially therebetween, and further, separating members 77 are arranged within the gap, so that fluid passages 55, 176 and 184 are defined between the outer casing 50 and the inner casing 60. All or a portion of the outer casing 50 is formed using a resin material such as engineering plastics or the like.

17 Claims, 18 Drawing Sheets

HOT AND COLD WATER MIXING DEVICE

TECHNICAL FIELD

The present invention relates to a hot and cold water mixing device for mixing hot water and cold water and delivering the mixed water, and more particularly, to a hot and cold water mixing device having features in the construction of the casing thereof.

BACKGROUND ART

The hot and cold water mixing device such as a hot and cold water mixing faucet is formed therein with a hot water passage and a cold water passage, through which hot water and cold water flow, respectively, and at the same time, is formed with a mixing chamber therein for mixing the hot and cold water introduced and with a mixed water passage through which the mixed water is delivered, in order to mix the hot and cold water supplied from a hot water supply source and a cold water supply source, respectively, to deliver the mixed water having a desired temperature.

These fluid passages have hitherto been formed by providing a body (casing) of a faucet made by casting, with partition walls therein, through integral moulding (for example, refer to JPB-58(1983)-40060). The body casing made by casting has an advantage in that the fluid passages therein can be formed in relatively free forms; however, there is a problem in that the body casing becomes large in configuration and also heavy in weight.

A hot and cold water mixing device has, therefore, been developed in which the body casing is composed of a hollow metal pipe material in place of the body casing made by casting, and a hollow inner casing is inserted into the pipe material, fluid passages being formed in the gap between the pipe material and the inner casing (U.S. Pat. No. 4,610,393).

In the hot and cold water mixing device comprising the pipe material and the inner casing inserted therein, the pipe material is provided with openings which communicate with a hot water supply passage, a cold water supply passage and a mixed water delivery passage, and further, the inner casing is also provided with water holes which communicate with the hot water supply passage, water supply passage and mixed water delivery passage. Further, the openings of the pipe material and the water holes of the inner casing are disposed with the respective passages corresponding to the hot water supply passage, cold water supply passage and mixed water delivery passage being close to each other, and seal members (O-rings) are provided between the respective openings and the water holes in the circumferential direction, so that the hot water passage, mixed water passage and cold water passage are formed in a divided manner in the axial direction of the pipe material.

In the inner casing of this hot and cold water mixing device is incorporated an opening and closing valve for adjusting the delivery amount of the mixed water and a mixing valve having an automatic temperature-regulating function for automatically regulating the mixing ratio of hot and cold water in the relation corresponding to a set temperature.

Accordingly, the hot water, which has flowed into the inner casing through the opening and the water hole communicating with the hot water supply passage, and the cold water, which has flowed into the inner casing through the opening and the water hole communicating with the cold water supply passage, are passed through the mixing valve and mixed there in a suitable mixing ratio, and then the mixture is delivered from the mixed water delivery passage by the operation of the opening and closing valve.

The hot and cold water mixing device using the pipe material and inner casing has an advantage in that the dimension of the external form thereof is made smaller and reduced in weight, as compared with that using the body casing made by casting.

However, since a plurality of O-rings are mounted on the outer peripheral surface of the inner casing to form the hot water passage, mixed water passage and cold water passage in a divided manner from one end to the other end of the inner casing, the hot and cold water mixing device comes to be parted into three distributions of temperature—a high temperature part, a moderate temperature part and a low temperature part.

This results in losing the thermal balance of the entire hot and cold water mixing device, thereby causing the deformation of the parts due to the difference in thermal expansion, the deterioration of the high temperature parts, and a decrease in precision. Further, since the hot water at a high temperature flows over the entire circumference at one end of the body of the mixing faucet, a portion of the pipe material at the side of an operator comes to be a high temperature. This is very dangerous particularly in the case where the device is used in a bathroom.

Accordingly, a proposal is made to solve the problem of the thermal balance of the entire hot and cold water mixing device as mentioned above while maintaining the advantage of the pipe material being used as the body casing (U.S. Pat. No. 4,381,073).

According to such a proposal, the hot water supplied from the hot water supply passage into the pipe material flows directly into the inner casing without flowing in the circumferential direction of the pipe material and, simultaneously, the cold water supplied from the water supply passage once flows into the inside of the casing and, thereafter, flows out again into the gap between the pipe material and the inner casing to cover the inner casing with the cold water in a greater part of the outer circumference, thereby preventing the outer surface of the pipe material from being locally heated to bring about a danger and preventing a significant thermal imbalance from being caused over the entire hot and cold water mixing device.

The hot and cold water mixing device described in U.S. Pat. No. 4,381,073 solves the problem of thermal imbalance utilizing an advantage of the pipe material being used for the body casing; however, there is a problem in that the construction of the inner casing becomes extremely complicated and, simultaneously, an adjustment in the offsets between the openings of the pipe material and the water holes of the inner casing is difficult; so, the strict accuracy of finishing and assembly of the component parts is required.

Namely, in the hot and cold water mixing device described in FIG. 1 of U.S. Pat. No. 4,381,073, since the hot and cold water passages are formed by a plurality of O-rings mounted on the outer circumference of the inner casing, and the mixed water passage is formed by two O-rings mounted on the inner circumference of the inner casing, the water supplied from a water supply source flows through the complicated flow passages so that it flows into the inner casing at one time and, thereafter, is moved through the insides of the O-rings in the axial direction, and flows out again into the gap between the pipe material and the inner casing outwardly in the radial direction.

This increases the number of the parts constituting the water passages and also makes the construction of the assembly of these parts extremely complicated. Moreover, it is necessary to further dispose one more hollow casing within the inner casing to constitute the mixing water passage. In addition, the hot water flows over the entire circumference of the pipe material although it flows partially and, therefore, the problem of the danger of a scald has not yet been solved.

In the hot and cold water mixing device described in FIG. 2 of U.S. Pat. No. 4,381,073, as stated above, since the hot water passage is not formed over the entire circumference, the problem of the danger of a scald is solved. However, the water passages are complicated, like those described above, and the number of parts which constitute the mixing device is increased. For this reason, there is a problem in that the strict accuracy of finishing and assembly of each component is required, and therefore, the finishing and assembly of the hot and cold water mixing device are difficult.

On the other hand, there is the case where forming the body casing by casting or forging is necessary on the basis of the hot and cold water mixing device being required to have a feeling of quality and configuration which are adapted to the atmosphere in a place of installation. In such a case, machining such as cutting, polishing and the like must be carried out in the interior of the body casing.

Further, a reduction in noise, vibration and the like produced when the hot and cold water mixing device is used, is required.

The present invention has been made taking such points into consideration and aims at providing a hot and cold water mixing device which is easy to produce and which has a thermal insulation property.

Further, the present invention aims at providing a hot and cold water mixing device which allows the vibration and noise during the use of the device to be prevented.

DISCLOSURE OF INVENTION

According to the present invention, a hot and cold water mixing device which comprises:

an outer casing formed using resin material and having respective openings which communicate with a hot water supply passage, a cold water supply passage and a mixed water delivery passage;

a hollow inner casing which is inserted into said outer casing with a radial gap remaining therebetween and which is formed with two primary water holes communicating with said hot water supply passage and said cold water supply passage, respectively, and with a secondary water hole communicating with said mixed water delivery passage, said water holes being penetrated from the outer surface side; and separating members for defining fluid passages arranged within said gap between said outer casing and said inner casing.

According to the invention, the outer casing of the hot and cold water mixing device is constituted by a tubular body formed of synthetic resin material.

Further, according to the invention, the inner peripheral surface of the outer casing of the hot and cold water mixing device is at least partly coated with resin layer.

Besides, according to the invention, the outer casing of the hot and cold water mixing device is constituted by a tubular body made of metal and a further tubular body made of resin fitted to the interior of the metal tubular body.

BEST MODE FOR CARRY OUT THE INVENTION

Figure 1:
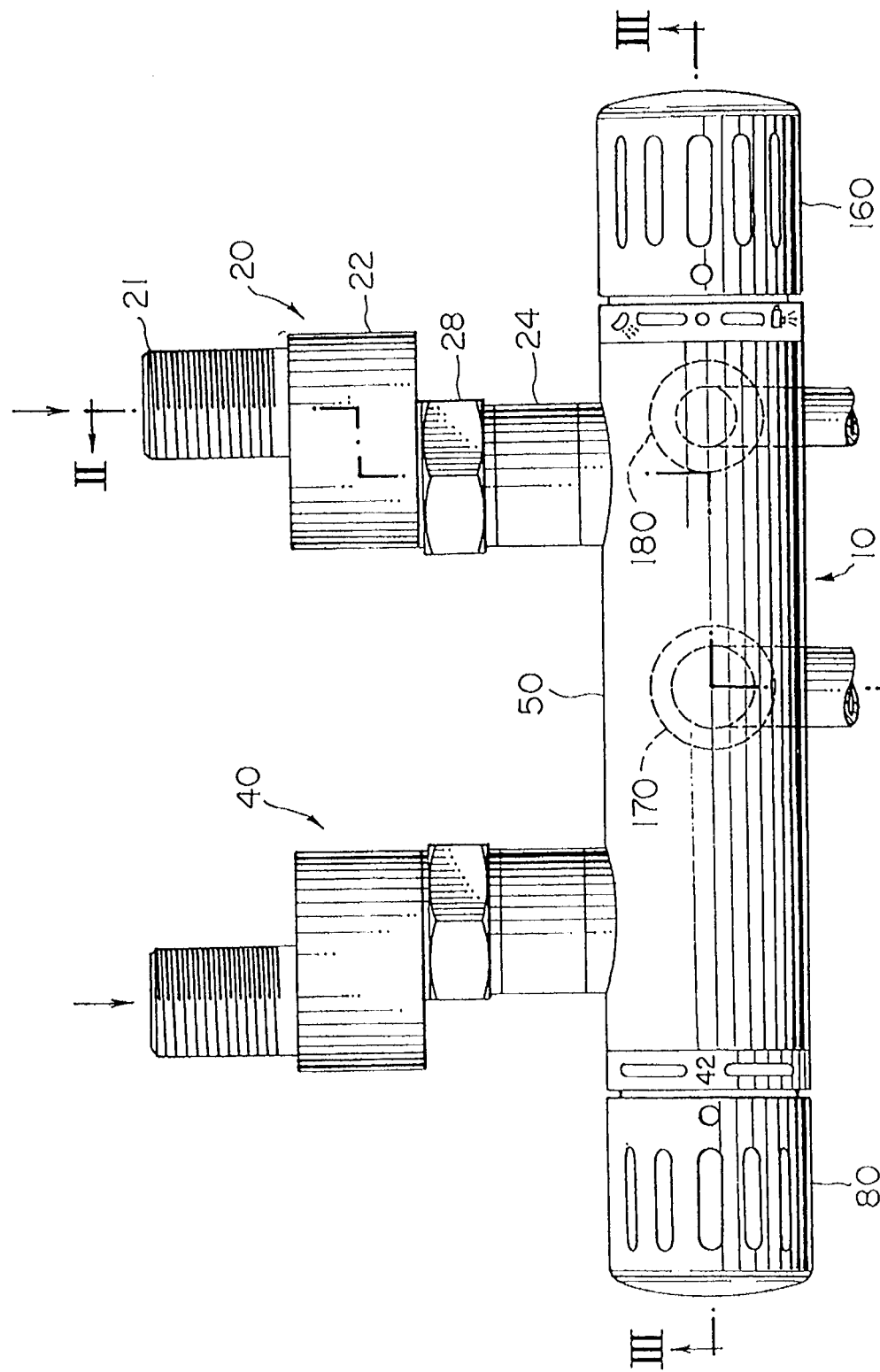
FIG. 1 is a plan view showing a first embodiment of a hot and cold water mixing device according to the invention.
Figure 2:
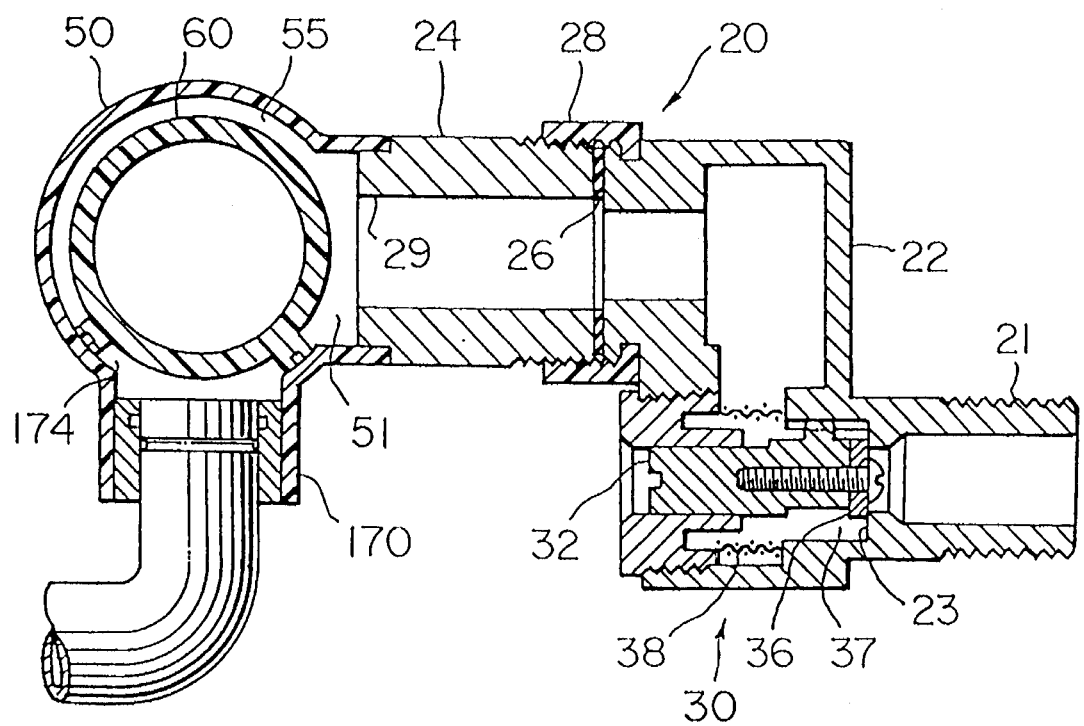
FIG. 2 is a sectional view taken along line II—II of FIG. 1.

FIG. 1 is a plan view showing a hot and cold water mixing device of a first embodiment of the invention. This hot and cold water mixing faucet comprises a mixing faucet body 10, a cold water supply fitting extension 20 to be connected to a cold water supply source (not shown) and a hot water supply fitting extension 40 to be connected to the pipe arrangement from a hot water supply source (not shown). The body 10 houses main function parts within an outer casing 50 and is provided at one end each thereof with a temperature regulating handle 80, and with a spigot, shower change-over and delivery amount adjusting handle 160. FIG. 2 is a sectional view taken along line II—II of FIG. 1 showing the construction of the cold water supply fitting extension 20. The cold water supply fitting extension 20 comprises a housing 22 in which a stop valve 30 is incorporated, a connecting piece 24, described later, connected to a cold water inlet opening 51 of the outer casing 50, and a tightener 28 for connecting and fixing the connection piece 24 to the housing 22. The connecting piece 24 is fitted by the outlet 29 at one end thereof into the cold water inlet opening 51 of the outer casing 50, which leads at the forward end thereof to a cold water passage 55, described later, formed within the outer casing 50. The connecting piece 24 has a threaded portion at the other end thereof which is threadably engaged by the tightener 28 to connect and fix it to the housing 22. At the other end of the housing 22 is formed an inlet 21 which is provided on the outer periphery with a threaded portion to be threadably engaged by a water pipe (water supply source). A packing 26 made of resin is mounted between the connecting piece 24 and the housing 22 to form a seal therebetween in a liquid-tight manner.

The stop valve 30 incorporated into the housing 22 is of such a known construction as described, for example, in Utility Model Publication Sho-56(1981)-26132, and rotation of the valve 32 brings the end 36 thereof into and out of engagement with a valve seat 23 formed on the housing 22 so that water is stopped or is allowed to flow. When water is allowed to flow, the water, which has passed through the gap between the end 36 and the valve seat 23, passes through the opening 37, and after removal of dust by means of a strainer 38, flows into the body 10 passing through the outlet 29.

The hot water supply fitting extension 40 is the same in construction as the cold water supply fitting extension 20, and makes a hot water supply pipe (not shown) communicate with the hot water inlet opening 52 (refer to FIG. 3) of the outer casing 50.

Figure 3:
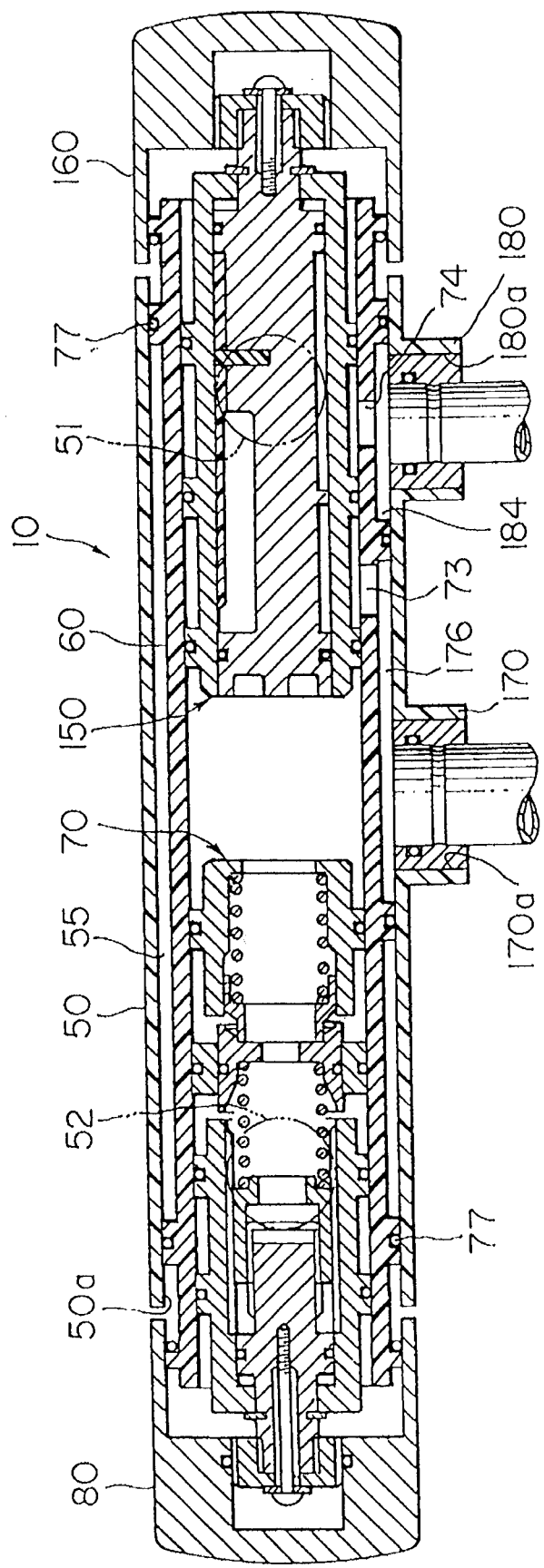
FIG. 3 is a sectional view taken along line III—III of FIG. 1.

FIG. 3 is a sectional view taken along line III—III of FIG. 1. As shown in FIG. 3, the body 10 comprises an inner casing 60 fitted in the outer casing 50, a mixing valve cartridge 70 accommodated in the inner casing 60, a change-over valve cartridge 150 similarly accommodated in the inner casing 60, a spigot outlet 170 and a shower outlet 180. Further, the outer casing 150 is formed with the cold water inlet opening 51 connected to the cold water supply fitting extension 20, the hot water inlet opening 52 connected to the hot water supply fitting leg 40, a spigot outlet opening 170a and a shower outlet opening 180a. The outer diameter of the inner casing 60 is smaller than the inner diameter of the outer casing 50 by a few millimeters so that a gap is produced between the two casings, and within the gap is formed the cold water passage 55, a hot water passage, a spigot mixed water passage 176 leading to the spigot outlet 170 for the mixed water and a shower mixed water passage 184 leading to the shower outlet 180 for the mixed water.

Figure 4:
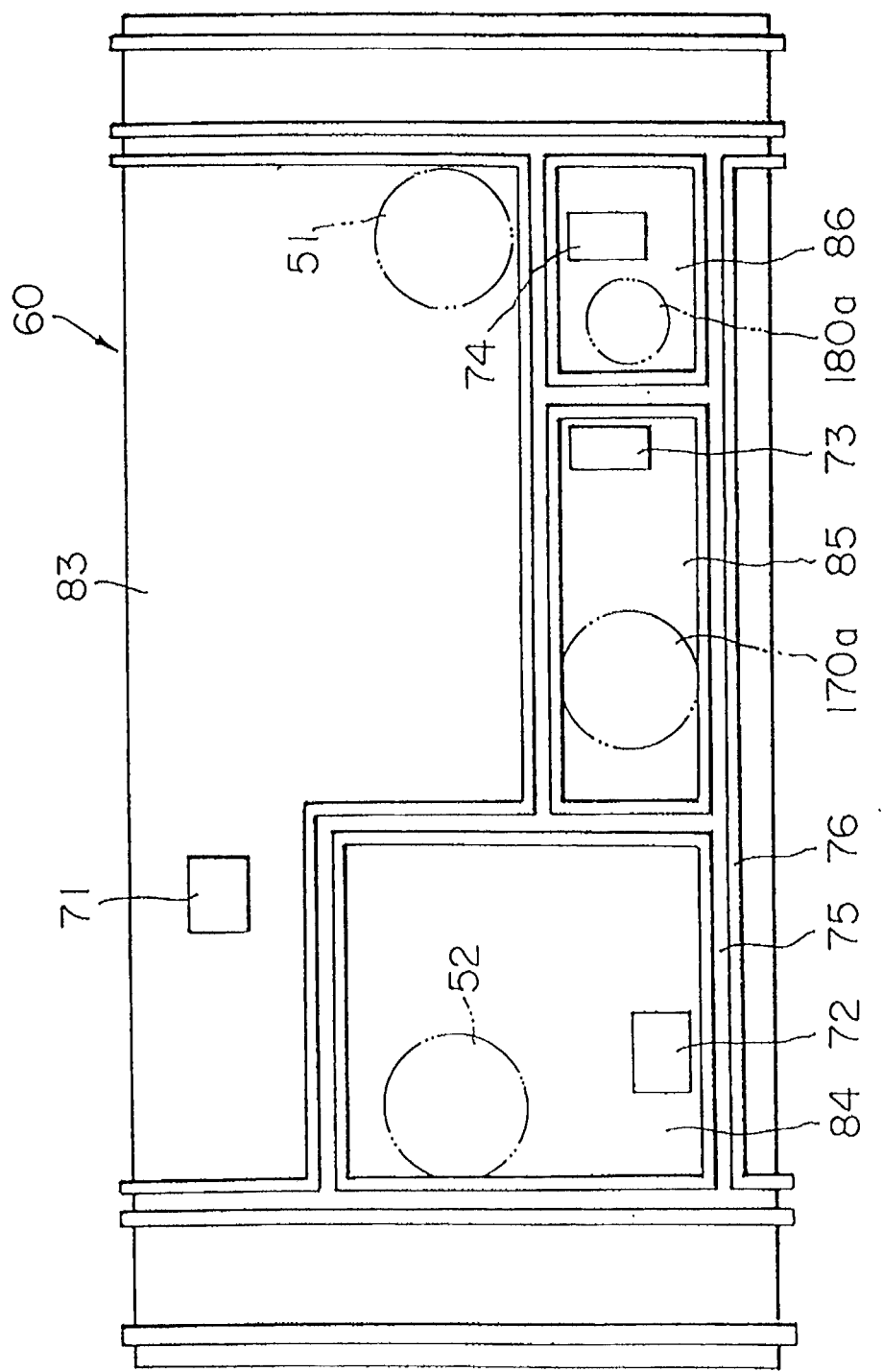
FIG. 4 is a view of the development showing the outer surface of an inner casing shown in FIG. 3.

FIG. 4 is a view of the development showing the outer surface of the inner casing 60 shown in FIG. 3. The inner casing 60 is provided with a cold water inlet hole 71, a hot water inlet hole 72, a first mixed water delivery hole 73 and a second mixed water delivery hole 74. The respective holes 71, 72, 73 and 74 are enclosed by seal-holding parts 76 formed with a concave groove 75 in which a seal member is fitted. The cold water inlet hole 71 is enclosed by the seal-holding parts 76 which define a relatively wide range, and within such an enclosed region 83 between the region and the outer casing 50 is defined the cold water passage 55. Moreover, within a region 84 enclosing the hot water inlet hole 72 between the region and the outer casing 50 is defined the hot water passage. In addition, within regions 85 and 86 enclosing the first and second mixed water delivery holes 73 and 74 between the respective regions and the outer casing 50 are defined a spigot mixed water passage 176 and a shower mixed water passage 184. The outer casing 50 and the inner casing 60 are assembled so that the cold water inlet opening 51, hot water inlet opening 52, spigot outlet opening 170a and shower outlet opening 180a communicate with the regions 83, 84, 85 and 86, respectively. In the concave groove 75 is fitted the seal member having an elasticity, for example, a rubber member 77 (FIG. 3), to form fluid passages.

In the present embodiment, the outer casing 50 is made of polyphenylene sulfide (PPS) which is a kind of engineering plastic. The PPS used for the outer casing 50 of the present embodiment is a plastic excelling particularly in heat resisting property, hot water resisting property and pressure resisting property. Moreover, in the present embodiment, the inner casing 60 is also made of PPS. In the present embodiment, the outer casing 50 is made of PPS; however, of course, plastics other than PPS, if excel in performance, can be used. For example, polyimide (PI), polyamide-imide (PAI), poly(ether-ether-ketone) (PEEK), polyether sulfone (PES), polysulfone (PSF), polyarylate (PAR), polyetherimide (PEI) and the like may be used.

At one side (the left side in FIG. 3) of the inner casing 60 is housed a mixing valve cartridge 70 for mixing hot and cold water in a suitable ratio according to a set temperature to automatically regulate and maintain the temperature of the mixed water to a predetermined value. Reference character 80 indicates a temperature regulating handle for regulating the set temperature of the mixing valve cartridge 70. As this mixing valve cartridge 70, those of known construction may be used (for example, JPB-61(1986)-50194 and JPB-56(1981)-24147).

Further, at the other side (the right side in FIG. 3) of the inner casing 60 is housed a change-over valve cartridge 150 for performing a changeover of the discharge and stoppage of the mixed water from the spigot outlet 170 and shower outlet 180 respectively and an adjustment of the amount of discharge of the mixed water. As this change-over valve cartridge 150, those of known construction may be used (for example, JPA-2(1990)-256727). The changing operation of the change-over valve cartridge 150 is performed by means of a change-over handle 160 attached so as to protrude out of the body 10.

In the present embodiment, the outer casing 50 is at least opened at any one end, and the inner diameter of this opening 50a is made slightly larger than the maximum outer diameter of the inner casing 60. This enables the inner casing 60 to be inserted into the outer casing 50 through the opening 50a. In addition, the insertion opening 50a of the outer casing 50 is also used as a communicating hole which connects the temperature regulating handle 80 and the mixing valve cartridge 70. Further, this insertion opening of the outer casing may be provided at the side of the change-over handle 160.

According to the present embodiment, the cold and hot water which have flowed from the cold water inlet opening 51 and the hot water inlet opening 52, respectively, flow through the cold water passage 55 and the hot water passage in the gap between the inner casing 60 and the outer casing 50, and then flow from the cold water inlet hole 71 and the hot water inlet hole 72 into the inner casing 60. The hot and cold water are mixed into the mixed water having a set temperature in the mixing valve cartridge 70, and operation of the change-over valve cartridge 150 allows the mixed water to be discharged out of the spigot outlet 170 or the shower outlet 180 after passing through the spigot mixed water passage 176 or the shower mixed water passage 184.

In the present embodiment, since the outer casing 50 is made of a PPS having heat resisting property, the outer peripheral surface of the outer casing 50 can be prevented from being heated. This makes it possible to reverse the cold water flow passage and the hot water flow passage, that is, to use the cold water passage 55 as a hot water flow passage. Therefore, even if a change in the position of the installation of the cold water supply passage and hot water supply passage arises, the present embodiment can easily cope with it without changing the inner construction. Moreover, it permits the construction of the inner flow passages to be simplified as compared with the hot and cold water mixing device described in U.S. Pat. No. 4,381,073.

Further, since the outer casing 50 is made of PPS, which has a lower specific gravity than metal materials such as alloy or castings, the entire hot and cold water mixing device becomes light in weight, and can easily be handled when the conveyance and works of installation of the hot and cold water mixing device are carried out. Moreover, the inner casing 60, mixing valve cartridge 70 and change-over cartridge 150 can also be made of PPS or the like. In such a case, the device can be made even lighter.

In addition, since the wall thickness of the outer casing 50 is made constant and is free from unevenness, it can be produced by means of a simple integral injection moulding. In this case, since the inner peripheral surface of the outer casing 50 can be made smooth, there is no need of making secondary machining such as grinding, polishing or the like of the inner peripheral surface portion of the outer casing 50 with which seal members such as O-rings and the like come into contact. Further, any depression at the time of forming, which is seen in the case where any difference in wall thickness exists, is not produced, and therefore, a better external appearance can be obtained. Moreover, the cold water passage 55 and the hot water passage are formed in the gap between the outer casing 50 and the inner casing 60, the diameter of the outer casing 50 being made smaller as compared with the case where flow passages having circular cross sections or rectangular cross sections are provided. In addition, the present embodiment has the construction of water being discharged depending upon the selection of spigot and shower, however, the construction of water being discharged only from the spigot or only from the shower may be satisfactory.

Figure 5:
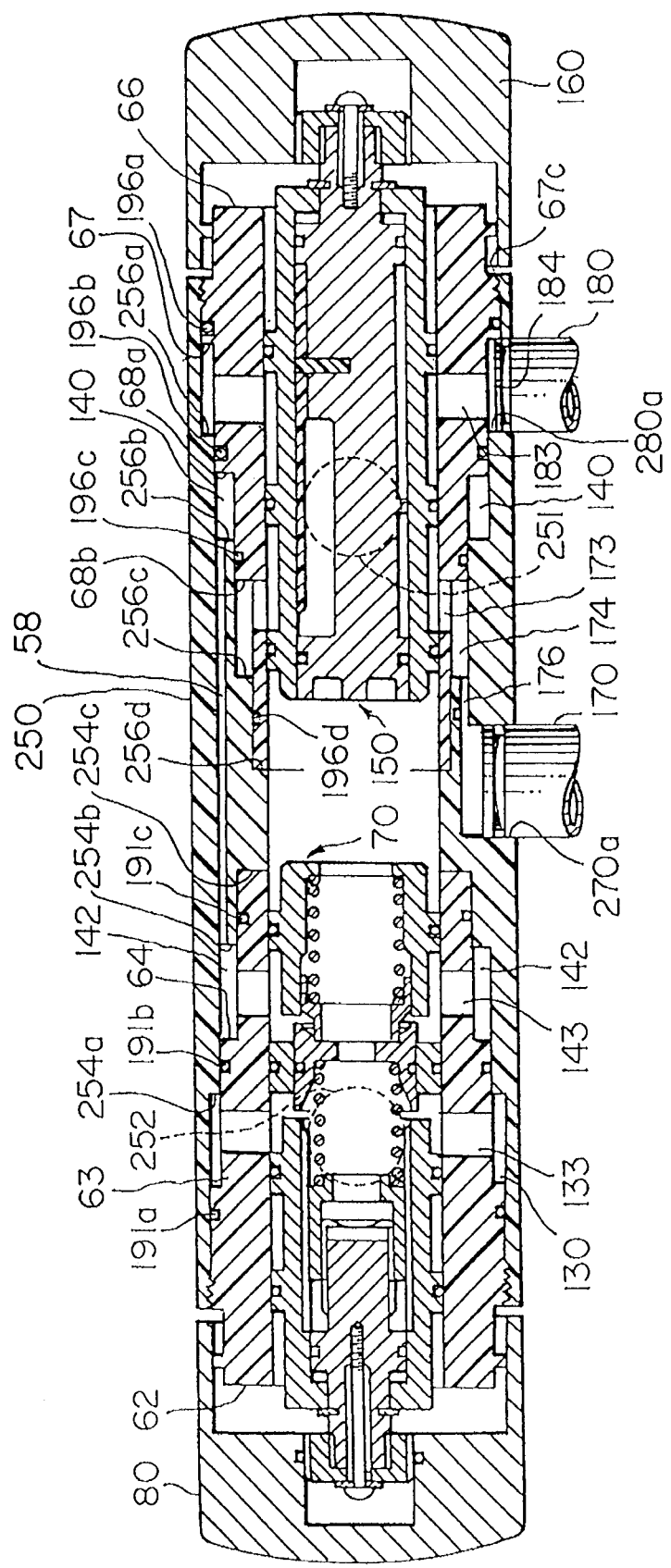
FIG. 5 is a sectional view corresponding to FIG. 3 showing a second embodiment of the invention.

FIGS. 5 to 8 show a second embodiment of the present invention. In the present embodiment, as shown in FIG. 5, the mixing valve casing 62 and the change-over valve casing 66 are accommodated and disposed within the outer casing 250, the mixing valve cartridge 70 is accommodated within the mixing valve casing 62, and the change-over valve cartridge 150 is accommodated within the change-over valve casing 66. Further, the outer casing 250 is formed with a cold water inlet opening 251, a hot water inlet opening 252, a spigot outlet opening 270a and a shower outlet opening 280a. The outer casing 250, the mixing valve casing 62 and the change-over valve casing 66 are made of PPS.

Figure 6:
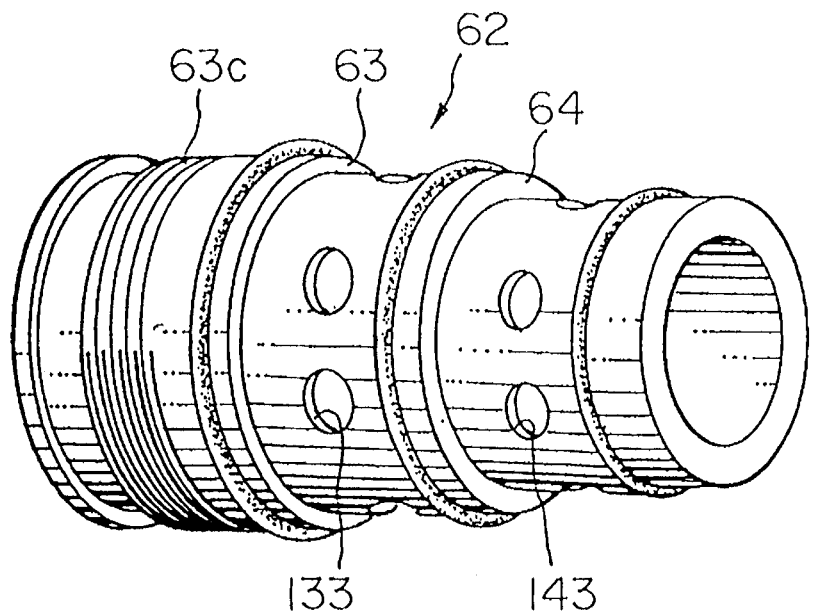
FIGS. 6 and 7 are external perspective views showing the external appearances of the respective inner casings shown in FIG. 5.

On the inner circumferential surface of the outer casing 250 are formed stepped portions 254a, 254b, 254c, 256a, 256b, 256c and 256d directed inwardly in the axial direction from both open ends. On the other hand, as shown in FIG. 6, on the outer circumferential surface of the mixing valve casing 62 are formed a projection 63 for an O-ring to seal it with the inner circumferential surface of the outer casing 250, and a stepped portion 64 between the projection 63 and the insertion end. Between the projection 63 and the inner circumferential surface of the outer casing 250 is provided a slight clearance which is sealed by an O-ring 191a. Further, between the outer circumferential surface at the greater radius side of the stepped portion 64 and the inner circumferential surface at the smaller inner diameter side of the stepped portion 254a of the outer casing 250 is provided a slight clearance which is sealed by an O-ring 191b. Accordingly, an annular space is formed by the projection 63 of the mixing valve casing 62 and the stepped portion 254a of the outer casing 250, and is used as a hot water passage 130. Moreover, also, between the outer circumferential surface at the insertion end of the mixing valve casing 62 and the inner circumferential surface at the smaller inner diameter side of the stepped portion 254b of the outer casing 250 is provided a slight clearance which is similarly sealed by an O-ring 191c. Accordingly, an annular space is formed between the stepped portion 64 of the mixing valve casing 62 and the stepped portion 254b of the outer casing 250, and is used as a cold water passage 142.

Figure 7:
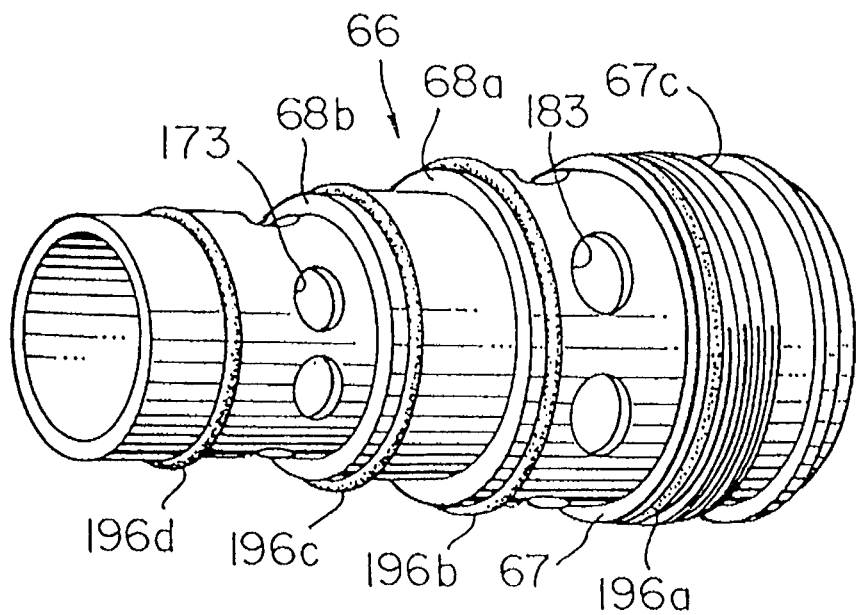

Similarly, on the outer circumferential surface of the change-over valve casing 66 are formed a projection 67 and stepped portions 68a and 68b, as shown in FIG. 7, and the projection 67 and the stepped portion 256a of the outer casing 250 form a mixed water passage 184 leading to the shower outlet 180, the stepped portion 68a and the stepped portion 256b of the outer casing 250 forming the cold water passage 140, and the stepped portion 68b and the stepped portion 256c of the outer casing 250 forming a mixed water passage 174 leading to the spigot outlet 170. Also here, on the outer peripheral surface of each stepped portion and the insertion end are provided O-rings 196a, 196b, 196c and 196d in order to allow for shutting off between each flow passage.

A passage 58 is formed in the outer casing 250 so that the cold water passage 140 and the cold water passage 142 communicate with each other. Further, a passage 176 is formed in the outer casing 250 so that the mixed water passage 174 leading to the spigot outlet 170 and the spigot outlet 170 communicate with each other.

The cold water, which has flowed from the cold water inlet opening 251 into the cold water passage 140, passes through the passage 58 and cold water passage 142 and flows from the water inlet hole 143 into the mixing valve cartridge 70, and the hot water flows from the hot water inlet opening 252, passes through the hot water passage 130 and flows from the hot water inlet hole 133 into the mixing valve cartridge 70. Then, the hot and cold water are mixed in the mixing valve cartridge 70, and the mixed water flows by way of the change-over valve cartridge 150 and flows out of the spigot outlet 170 through the spigot outlet hole 173 or out of the shower outlet 180 through the shower outlet hole 183.

In the hot and cold water mixing device of the second embodiment as explained above, since the outer casing 250 is shaped so that the inner diameter thereof becomes smaller from the open end portion in steps, it is easy for the outer casing to be formed by means of integral injection moulding, and the shape thereof can be made to one suitable for mass production. Further, since the outer casing 250 is shaped so that it becomes smaller from the open end portion in steps, the distance through which the seal members are shifted transversely can be made smaller when the mixing valve casing 62 or the change-over valve casing 66 is inserted into the outer casing 250. For example, the O-ring 191c, which is provided deep inside the outer casing 250, is shifted transversely only a few millimeters from the stepped portion 254b of the outer casing 250 making contact with the inner circumferential surface of the outer casing 250. Accordingly, damage to the seal members at the time of the assembly can be reduced. Besides, since the outer casing 250 is made of a PPS having a thermal resistance, the outer peripheral surface of the outer casing 250 can be prevented from being heated.

In the second embodiment, mounting of the O-rings 191a, 191b and 191c for sealing each of the flow passages formed between the outer casing 250 and the mixing valve casing 62 is carried out by pressing them between the inner peripheral surface of the outer casing 250 and the outer peripheral surface of the mixing valve casing 62; however, mounting of the seals may be performed using the methods shown in FIG. 8.

FIG. 8 is a fragmentary enlarged sectional view showing methods for sealing each of the flow passages for cold or hot water and mixed water defined by the outer casing 250 and the mixing valve casing 62. FIG. 8(a) shows the sealing method explained in the second embodiment, by which the O-rings 192a and 193a are positioned between the inner peripheral surface of the outer casing 250 and the outer peripheral surface of the mixing valve casing 62. By using this sealing method, the distance through which the seal member is shifted transversely can be made smaller when the mixing valve casing 62 is inserted into the outer casing 250, as described above.

Figure 8A:
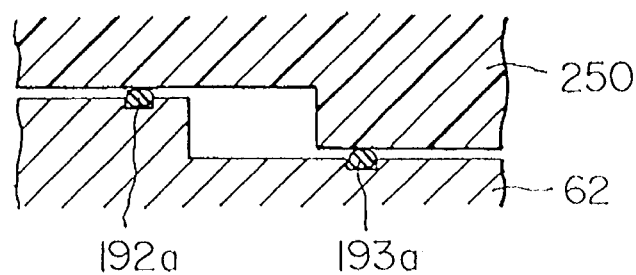
FIGS. 8(a)–8(d) are fragmentary enlarged sectional views showing the seal constructions of the gaps between the outer casing and the inner casings shown in FIG. 5, respectively.
Figure 8B:
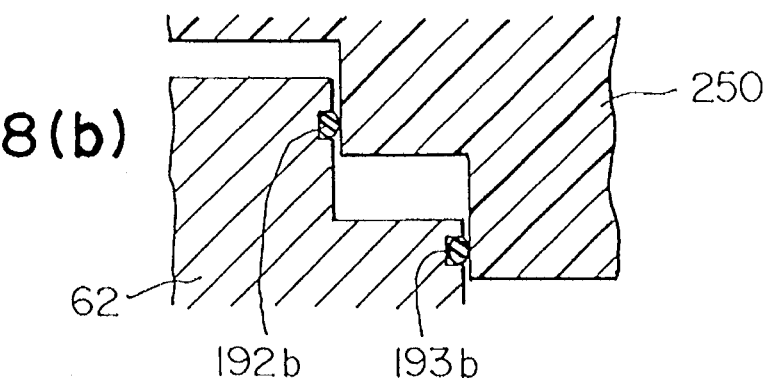

FIG. 8(b) shows a sealing method by which the O-rings 192b and 193b are positioned between the end surface of the stepped portion of the outer casing 250 and the end surface of the stepped portion of the mixing valve casing 62. With this sealing method, since the O-rings 192b and 193b disposed on the end surfaces of the stepped portion have no chance to make contact with the inner peripheral surface of the outer casing 250 when the mixing valve casing 62 is inserted into the outer casing 250, damage of the O-rings 192b and 193b due to the contact thereof being able to be prevented. Besides, since loads applied to the O-rings 192b and 193b can be adjusted, the sealing force can be made stronger.

Figure 8C:
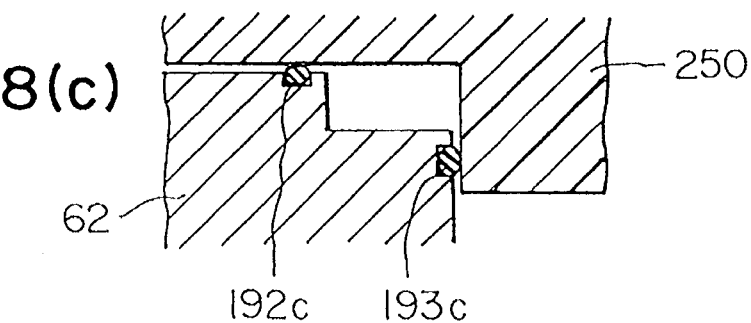
Figure 8D:
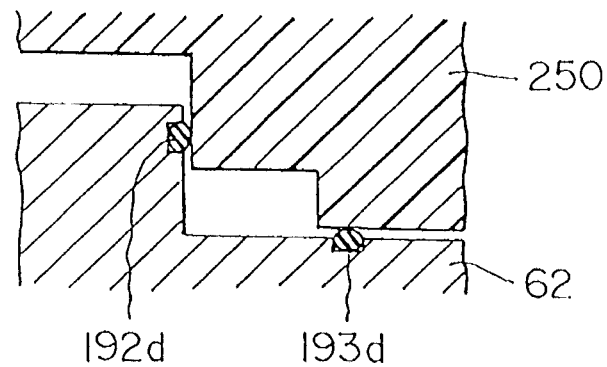

Further, these sealing methods can be combined in such a manner that, as shown in FIG. 8(c) or FIG. 8(d), one of the respective two O-rings, 192c and 193d, in the flow passages are positioned between the inner peripheral surface of the outer casing 250 and the outer peripheral surface of the mixing valve casing 62, and the other of the respective two O-rings, 193c and 192d, are positioned between the end surface of the stepped portion of the outer casing 250 and the end surface of the stepped portion of the mixing valve casing 62. The combination of these sealing methods depends on the materials used, the manner of the action of water pressure and the like. This similarly applies to the case where the flow passages defined by the outer casing 250 and the change-over valve casing 66 are sealed.

Figure 9:
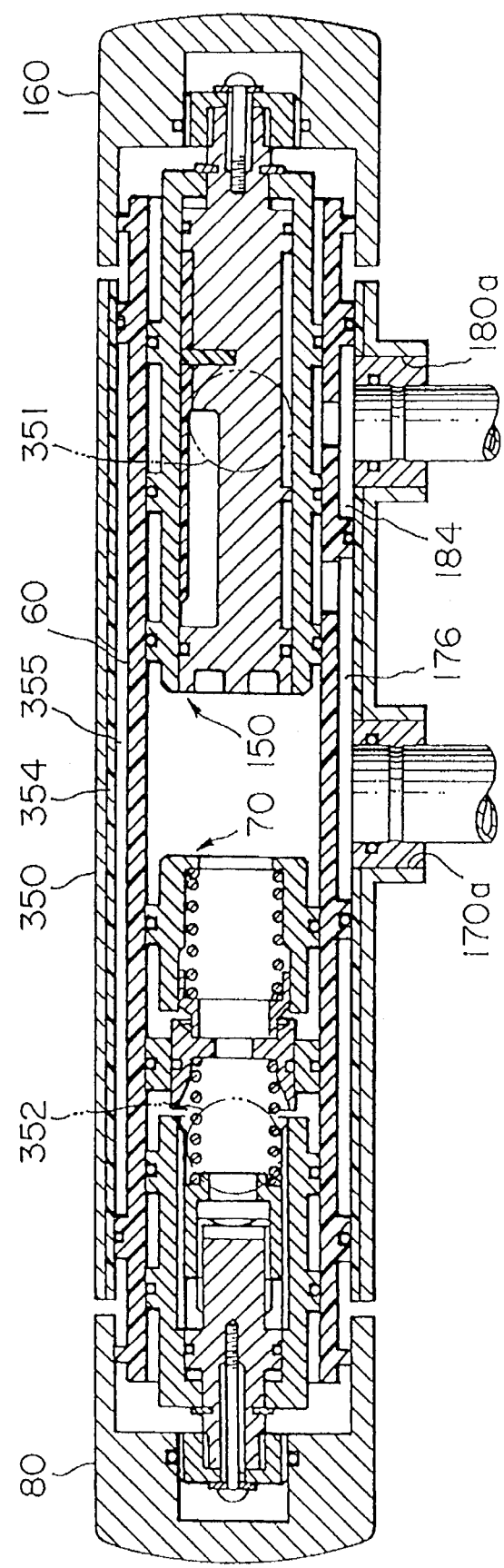
FIG. 9 is a sectional view corresponding to FIG. 3 showing a third embodiment of the invention.

FIG. 9 is a sectional view showing a third embodiment of the invention. In the present embodiment, an outer casing 350 is made of a pipe material of alloy, and a coating layer 354 of polytetrafluoroethylene having a thickness of 100 μm is applied to the inner peripheral surface of the outer casing 350. This polytetrafluoro-ethylene is a type of fluoroplastic and is a resin excelling in thermal resistance as well as chemical resistance and having a small frictional coefficient. The present embodiment uses polytetrafluoroethylene for the coating layer 354; however, thermosetting epoxide resin may be used. Epoxide resin has a great adhesion to metal and, if a curing agent is suitably selected to raise its softening point, it can be made into a plastic superior in thermal resistance. Of course, plastics other than these can be used if they excel in performance. For example, fluoroplastics other than polytetrafluoroethylene such as polyphenylene sulfide (PPS), polyimide (PI), polyamide-imide (PAI), poly(ether-ether-ketone) (PEEK), polyether sulfone (PES), polysulfone (PSF), polyarylate (PAR), polyetherimide (PEI) or the like can be used.

The coating layer 354 of the outer casing 350 is coated by fusing polytetrafluoroethylene and spraying it onto the outer casing, and the required thickness of the layer is obtained by adjusting the amount to be sprayed. Further, in the case where thermosetting epoxide resin is used, it is fused in a solvent and sprayed to form the coating layer 354. In the present embodiment, the resin layer is obtained by spraying polytetrafluoroethylene as described above; however, another construction is preferable which is formed by previously forming a resin having thermal resistance into a pipe and inserting the pipe inside the outer casing 350.

The other construction is the same as that of the first embodiment shown in FIG. 3.

Figure 10:
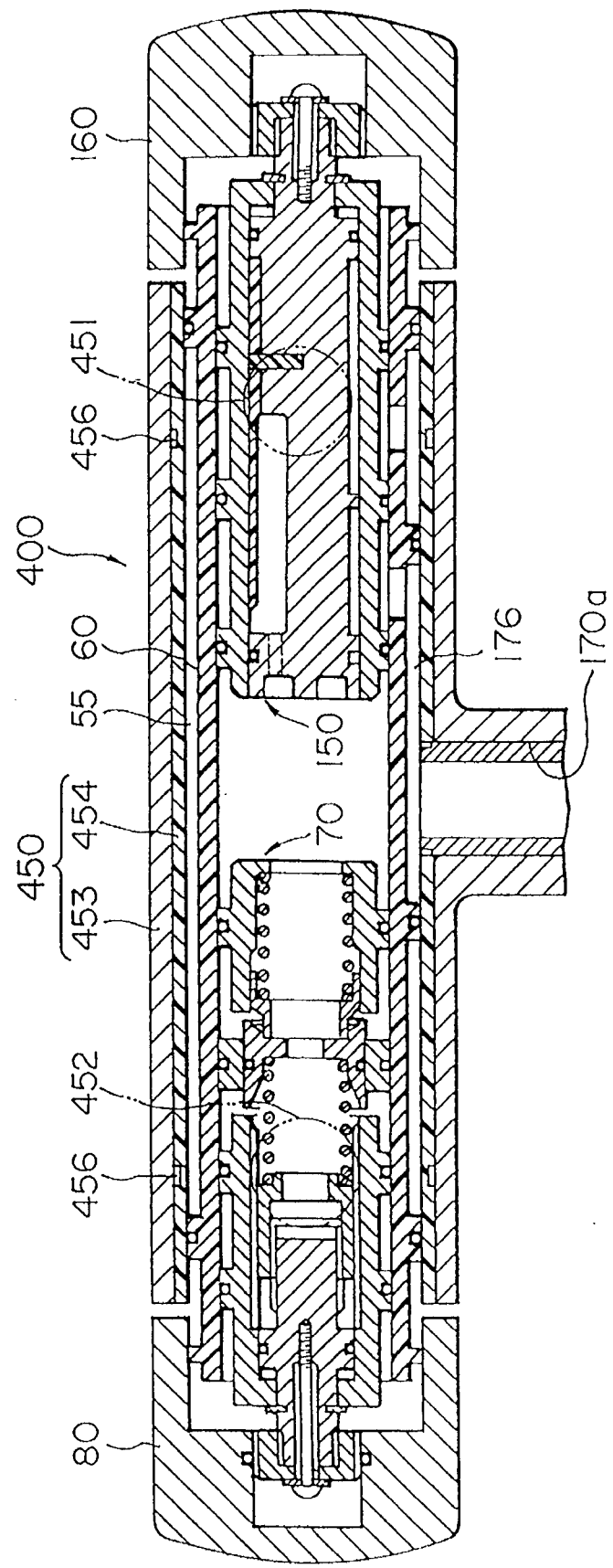
FIG. 10 is a sectional view corresponding to FIG. 3 showing a fourth embodiment of the invention.

According to the present embodiment, since the coating layer 354 of polytetrafluoroethylene is applied to the inner peripheral surface of the outer casing 350, erosion due to cavitation of the outer casing 350 can be prevented. Moreover, since the surface of the coating layer 354 can be made smooth, there is no need to carry out any secondary machining such as grinding, polishing or the like of the parts with which the seal members such as O-rings or the like come into contact. Besides, if the coating layer 354 is made thick, the outer peripheral surface of the outer casing 350 can be prevented from being heated because the resin has thermal resistance. In addition, since the outer casing 350 is made of a pipe material of alloy, it has a sufficient strength. The outer casing 350 can be made of a material other than metal material. FIG. 10 is a sectional view showing a fourth embodiment of the present invention. In the present embodiment, the outer casing comprises a tubular body made of metal and a further tubular body made of resin fitted to the interior of the metal tubular body.

Namely, the outer casing 450 is composed of the tubular body 453 made of metal formed by means of casting or the like, and the further tubular body 454 made of resin fitted to the interior of the metal tubular body 453. As this resin tubular body 454, for example, engineering plastics such as PPS or the like can be used. Further, between the metal tubular body 453 and the resin tubular body 454 are interposed O-rings 456 for seal and fixation.

The other construction in the present embodiment is the same as that of the first embodiment of the present invention shown in FIG. 3, except that the outer casing 450 is provided with only a spigot outlet opening 170a and is not provided with a shower outlet opening.

The hot and cold water mixing device 400 according to the present embodiment can be assembled in such a manner that the outer casing 50 of the hot and cold water mixing device 10 in the first embodiment shown in FIG. 3 is inserted into the metal tubular body 453 from the end opening thereof and fixed therein. Namely, according to the present embodiment, although the outer casing 450, which provides an external appearance of the hot and cold water mixing device 400, is the part moulded by casting, it is sufficient for the outer casing 400 to allow the inner casing 60 to be merely housed therein, and therefore, machining the outer casing for insurance of the seal, for building in the mixing valve cartridge 70 and the change-over valve cartridge 150, and for forming the passages for cold and hot water and the like is not required. Accordingly, the present embodiment permits simplification of the manufacturing process of the hot and cold water mixing device having an appearance made by casting and giving a high-grade feeling.

Besides, since the tubular body 454 made of resin is covered on the outside by the tubular body 453 made of metal, the strength of the outer casing 450 is greatly increased as compared with the first embodiment.

Figure 11:
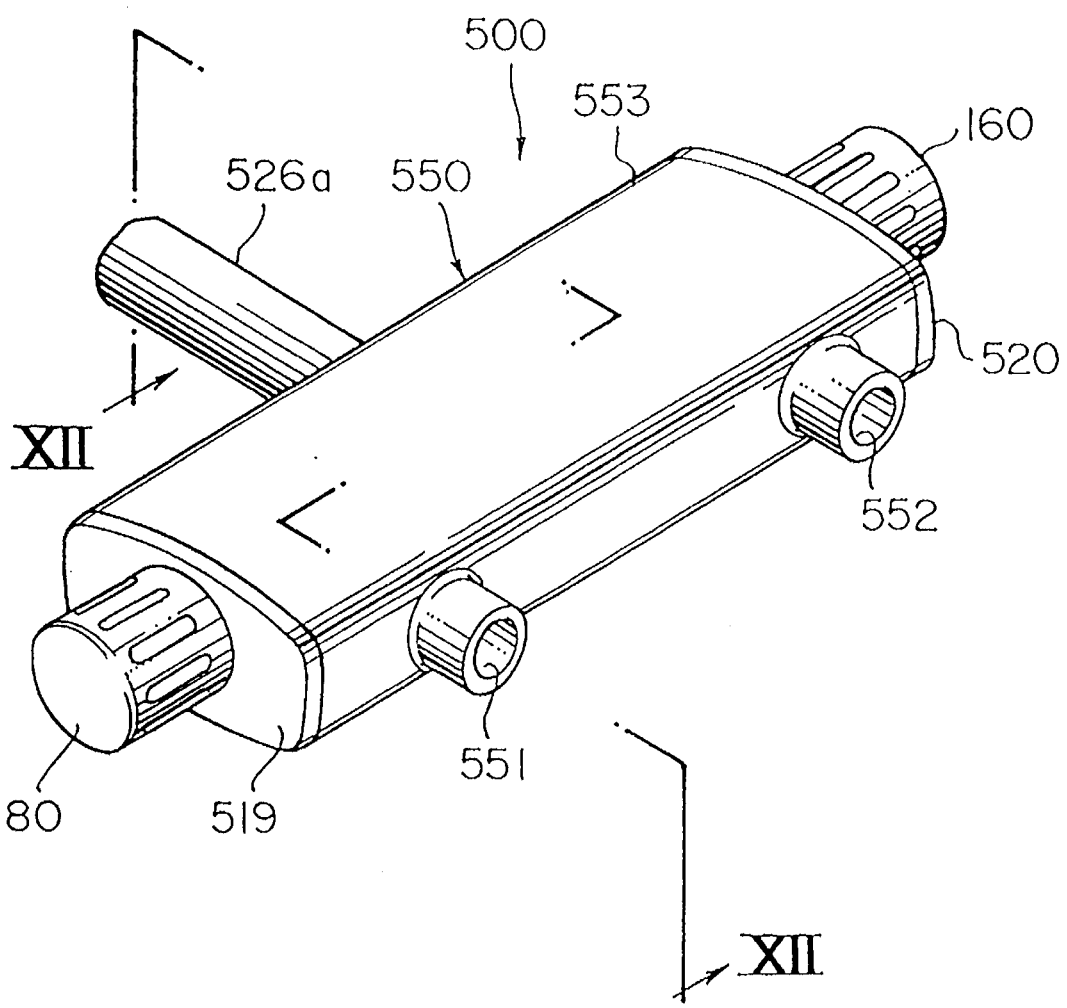
FIG. 11 is an external perspective view showing a fifth embodiment of the invention.
Figure 12:
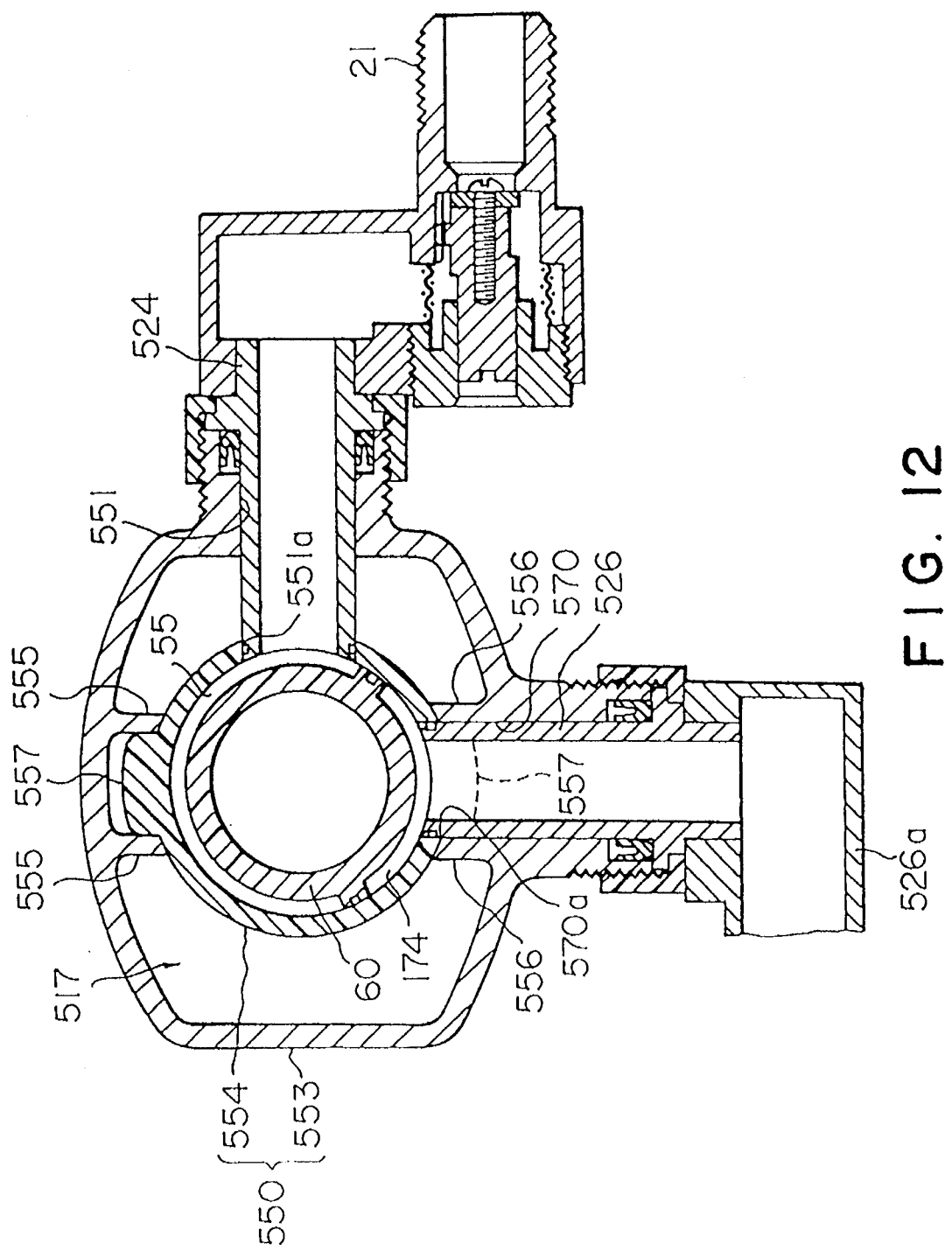
FIG. 12 is a sectional view taken along line XII—XII of FIG. 11.

FIGS. 11 and 12 are an external appearance perspective view showing a fifth embodiment of the present invention and a sectional view taken along line XII—XII of FIG. 11, respectively. In the present embodiment, the outer casing 550 has a cross section of an oval-like flat shape and is provided with the temperature regulating handle 80 and the change-over handle 160 extending from both ends thereof.

The outer casing 550 comprises a tubular body 553 made of metal by casting and a resin tubular body 554 fitted to the interior of the metal tubular body 553 with a gap 517 remaining therebetween. The metal tubular body 553 is provided therein with upper and lower holding ribs 555 and 556. Further, the resin tubular body 554 is provided with upper and lower projections 557 at the outside thereof, which are inserted between the ribs 555 and 556 so that the resin tubular body 554 is securely held within the metal tubular body 553.

The metal tubular body 553 is provided with an outer cold water inlet opening 551, an outer hot water inlet opening (not shown) and an outer mixed water outlet opening 570 and, further, the resin tubular body 554 is provided, at the positions corresponding to the above-mentioned respective openings, with an inner cold water inlet opening 551a, an inner hot water inlet opening (not shown) and an inner mixed water outlet opening 570a. In and to these openings are inserted and connected a cold water supply pipe 524, a hot water supply pipe (not shown) and a mixed water delivery pipe 526, which is further connected to a spigot 526a.

Also, the inner casing 60 is inserted into the resin tubular body 554 of the outer casing 550 with a radial gap remaining therebetween, similar to each embodiment as described above, and the cold water passage 55, hot water passage (not shown) and mixed water passage 174 are formed in the gap. The construction within the inner casing 60 is the same as that of the above-described embodiment, so the illustration thereof is omitted.

After the resin tubular body 554, inner casing 60, supply pipes, delivery pipe and the like are built in the metal tubular body 553 in such a manner as described above, the openings at both ends of the metal tubular body 553 are closed with lids 519 and 520.

With the present embodiment, in addition to the advantageous effects of the above-described embodiment, the degree of freedom in the design of the outer casing 550 is enlarged and various kinds of external appearances and forms can be provided. Besides, since the gap 517 is formed between the metal tubular body 553 and the resin tubular body 554 and air exists in the gap 517, these provide a thermal insulation effect and the temperature of the outer surface of the outer casing 550 does not rise to a high temperature, so the safety is ensured, and simultaneously, the effect of keeping warmth within the resin tubular body 554 can be improved.

Figure 13:
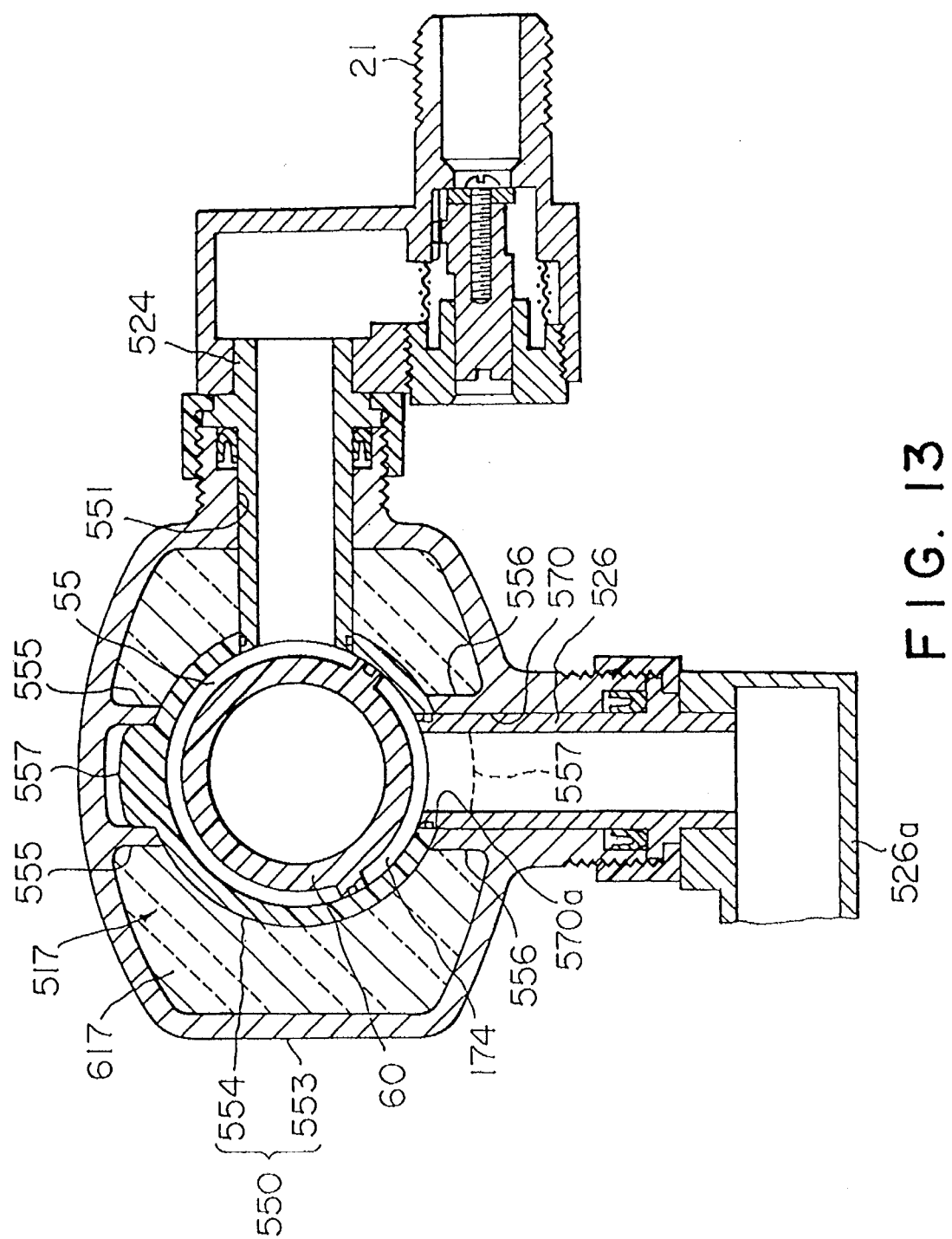
FIG. 13 is a sectional view corresponding to FIG. 12 showing a sixth embodiment of the invention.

FIG. 13 is a sectional view corresponding to FIG. 12, showing a sixth embodiment of the present invention. The present embodiment is the same in construction as the fifth embodiment as described above, and different only in that the gap 517 between the metal tubular body 553 and the resin tubular body 554 is filled with an intermediate member 617 other than air.

As such an intermediate member, a heat insulating material such as an expandable bead produced by foaming a foaming material consisting of polypropylene (PP) with a predetermined magnification or a rock wool heat insulating material produced by making non-combustible fiber collect. The method of filling with a heat insulating material includes a method of heating a foaming material, which is not yet foamed and previously disposed within the gap 517, by warm wind to cause it to foam to a predetermined magnification, thereby filling the gap, or a method of forcing a rock wool heat insulating material or the like through the opening of the metal tubular body 553 into the gap, thereby filling the gap.

With the present embodiment, since the intermediate member with a large thermal insulation property is disposed between the metal tubular body 553 and the resin tubular body 554, a larger thermal insulation effect can be provided. The interposed intermediate member enables the noise, vibration and the like produced during use of the hot and cold water mixing device to be absorbed, thereby providing a quiet and stable operation.

Figure 14:
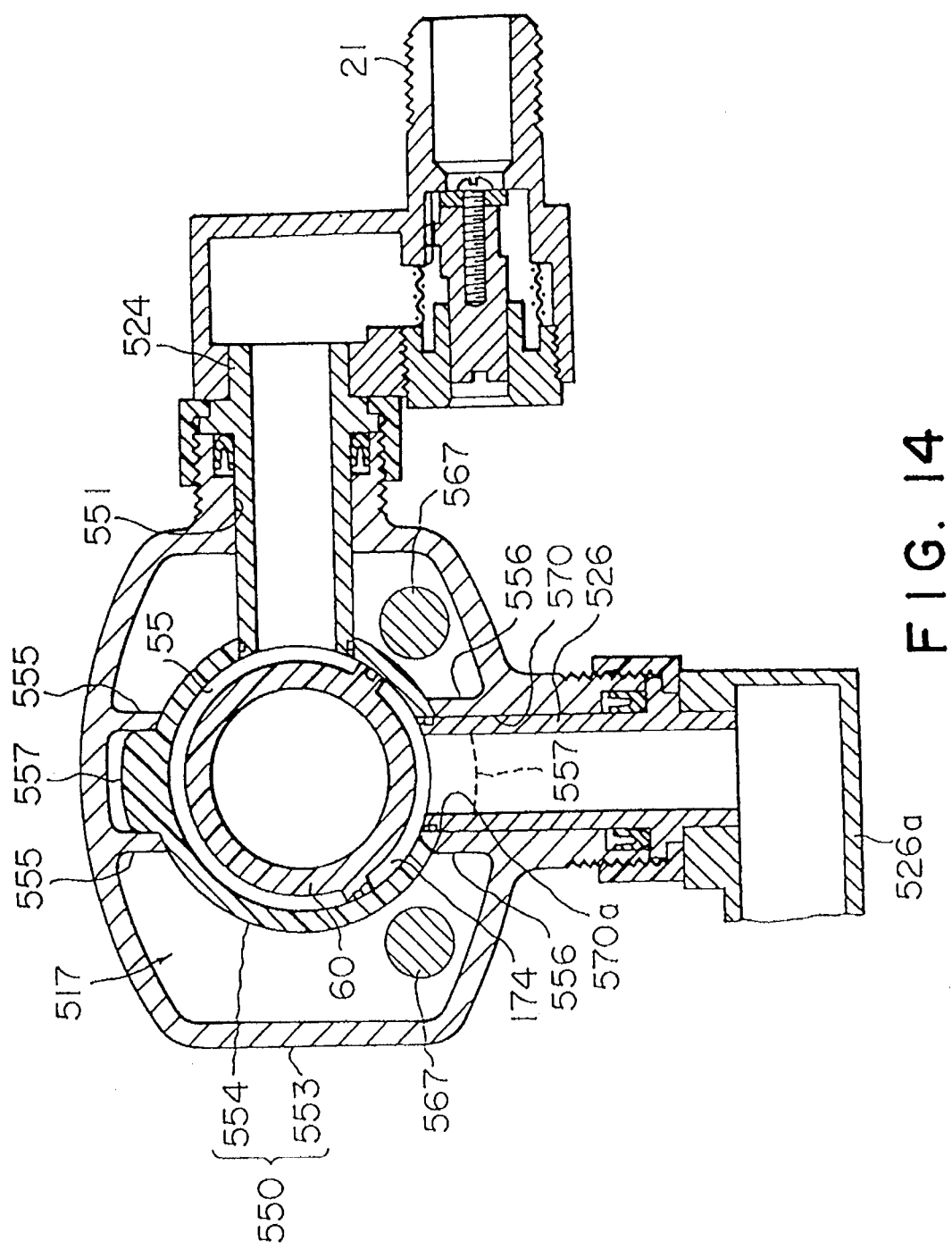
FIG. 14 is a sectional view corresponding to FIG. 12 showing a seventh embodiment of the invention.

FIG. 14 is a sectional view corresponding to FIG. 12, showing a seventh embodiment of the present invention. The present embodiment is the same in the basic construction as the fifth embodiment, and is different in that weight balance adjusting members 567 are disposed in the gap 517.

Namely, the weight balance members 567 each consisting of a shaft made of metal are disposed in the gap 517 between the metal tubular member 553 and the resin tubular member 554. This enables the weight of the entire hot and cold water mixing device to be adjusted to the weight substantially equal to that of the conventional hot and cold water mixing device made of casting, even when the outer casing 550 is constituted by a thin-walled metal tubular body 553 and a lightweight resin tubular body 554.

Figure 15:
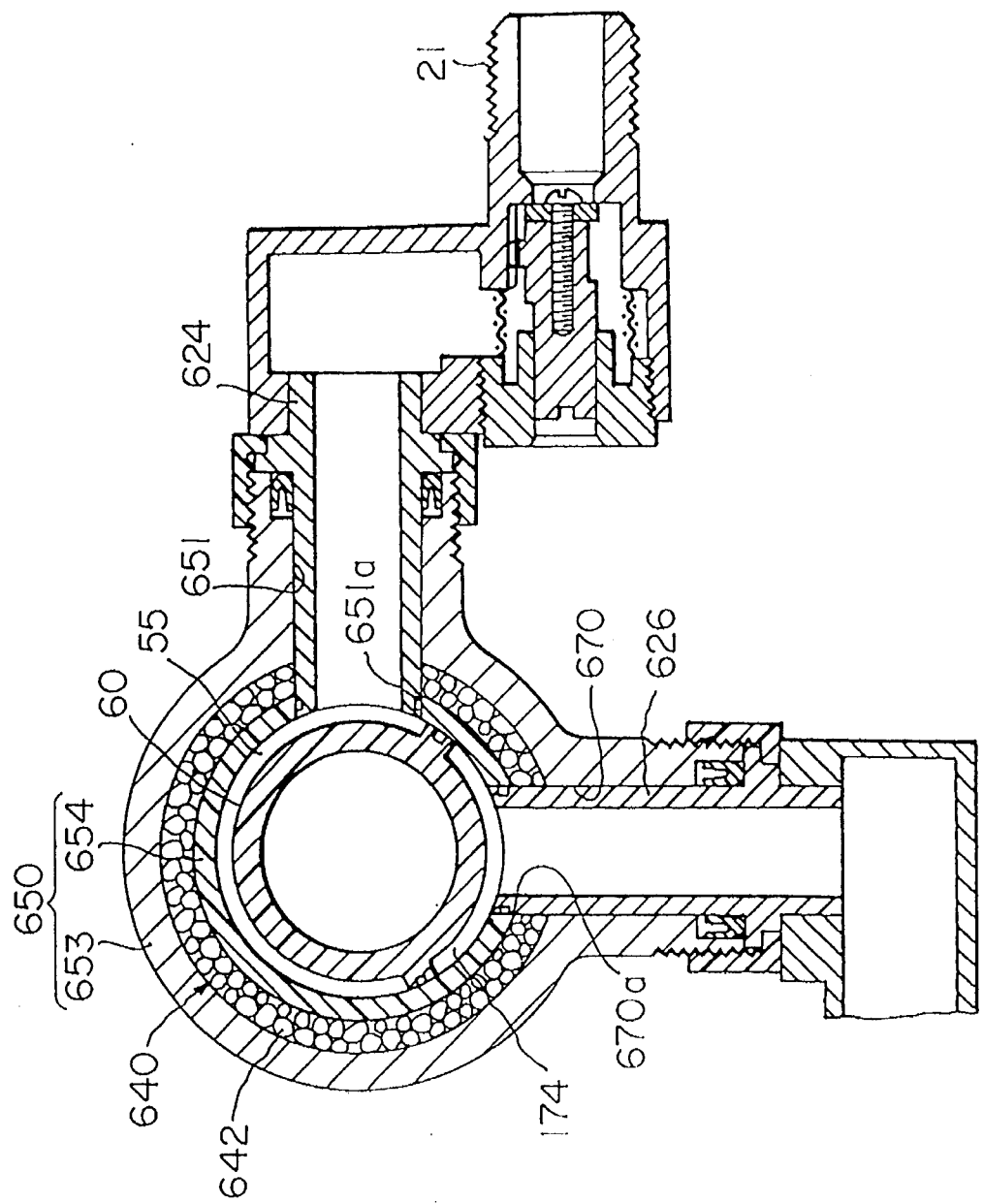
FIG. 15 is a sectional view corresponding to FIG. 2 showing an eighth embodiment of the invention.
Figure 16:
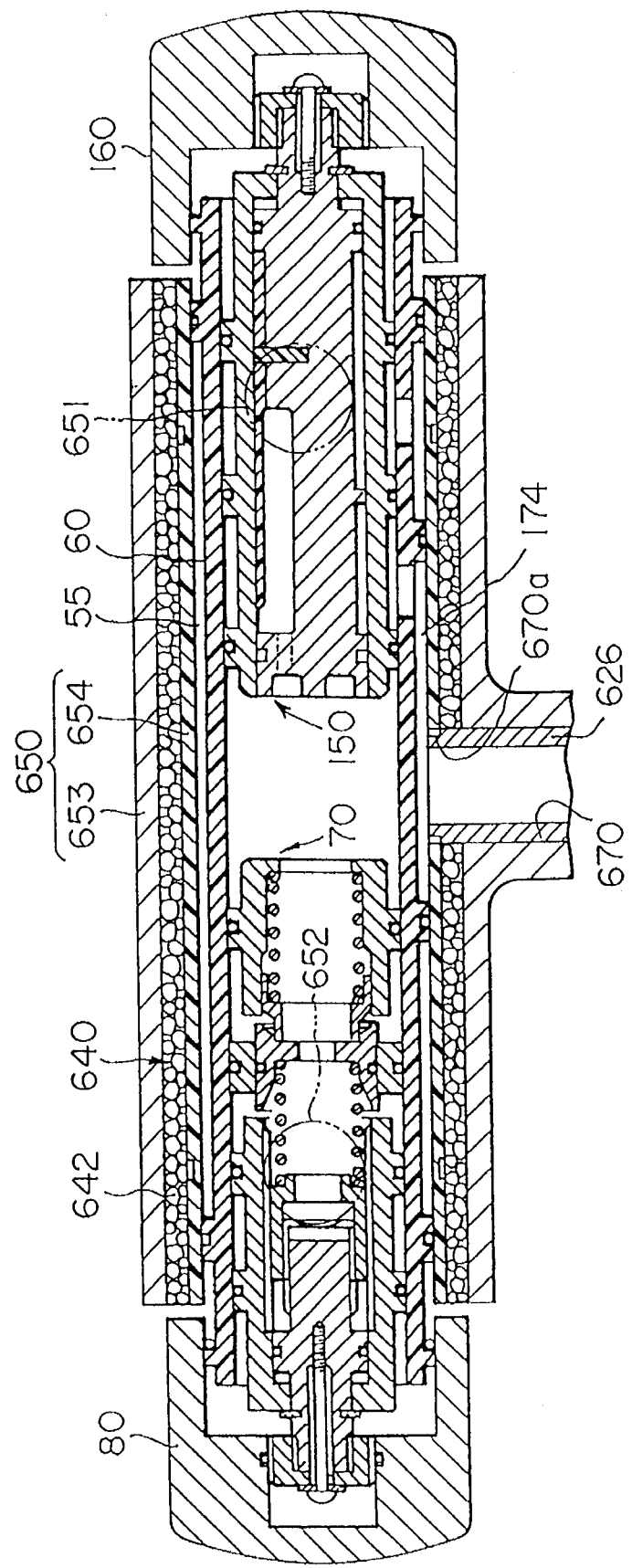
FIG. 16 is a sectional view corresponding to FIG. 3 showing an eighth embodiment of the invention.

FIGS. 15 and 16 are a sectional view corresponding to FIG. 2 and a sectional view corresponding to FIG. 3, respectively, both the views showing an eighth embodiment of the present invention.

In the present embodiment, the outer casing 650 comprises a tubular body 653 made of metal by casting, a further tubular body 654 made of resin such as engineering plastics and fitted to the interior of the tubular body 653 with a gap 640 remaining therebetween, and an intermediate member 642 filled in the gap 640. As such an intermediate member, an expandable bead is used, similar to the sixth embodiment as described above.

Within the resin tubular body 654 of the outer casing 650 is disposed the inner casing 60 in which a fluid regulating means is housed, similar to the above-described embodiment. Further, the metal tubular body 653 is provided with an outer cold water inlet opening 651, an outer hot water inlet opening 652 and an outer mixed water outlet opening 670, and the resin tubular body 654 is provided, at the positions corresponding to the above-described respective openings, with an inner cold water inlet opening 651a, an inner hot water inlet opening (not shown) and an inner mixed water outlet opening 670a. To these openings are connected a water supply pipe 624, a hot water supply pipe (not shown) and a mixed water delivery pipe 626, respectively.

Also in the present embodiment, use of the resin tubular body 654 allows the outer casing 650 to be made even lighter and machining to be more facilitated, and simultaneously, filling the intermediate member 642 in the outer casing 650 enables a thermal insulation effect and anti-noise and vibration damping effects to be provided, similar to the above-described embodiment.

In the present embodiment, the metal tubular body 653 can also be made of resin. Namely, interposition of the intermediate member 642 permits the strength of the outer casing 650 to be increased, and the outermost casing can be made as a resin tubular body. This enables the outer casing to be made even lighter and a decrease in cost thereof to be promoted.

Figure 17:
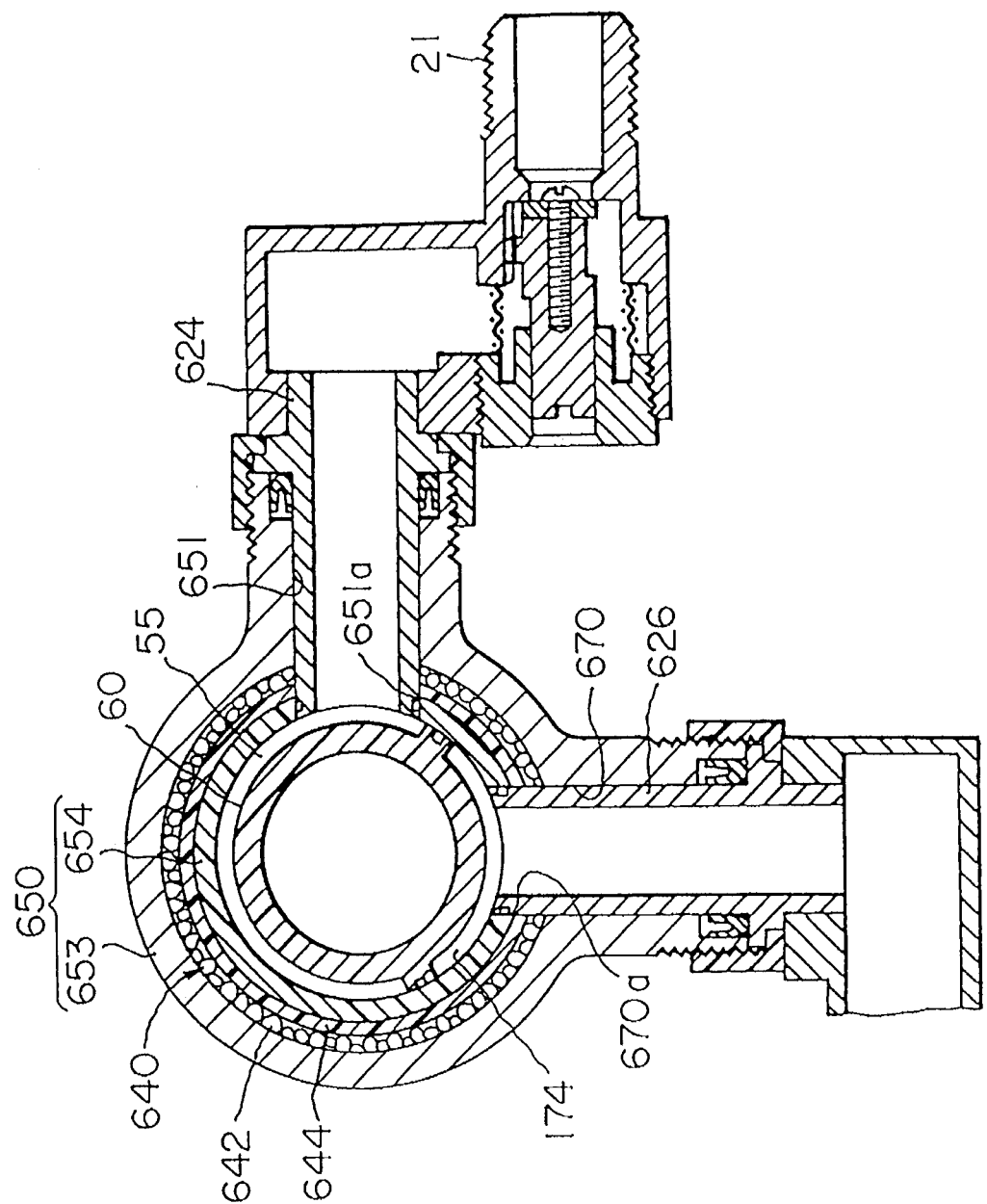
FIG. 17 is a sectional view corresponding to FIG. 2 showing a ninth embodiment of the invention.

FIG. 17 is a sectional view corresponding to FIG. 2, showing a ninth embodiment of the present invention.

The present embodiment is a modification of the above-described eighth embodiment, and is the same in the basic construction as the eighth embodiment. In the present embodiment, within the gap 640 between the metal tubular body 653 of the outer casing 650 and the resin tubular body 654 is inserted a metal pipe 644 for covering the outer periphery of the resin tubular body 654, as another intermediate member in addition to the expandable bead 642. With the present embodiment, an adjustment in the weight of the hot and cold water mixing device can be carried out by changing the material and thickness of the metal pipe 644.

Figure 18:
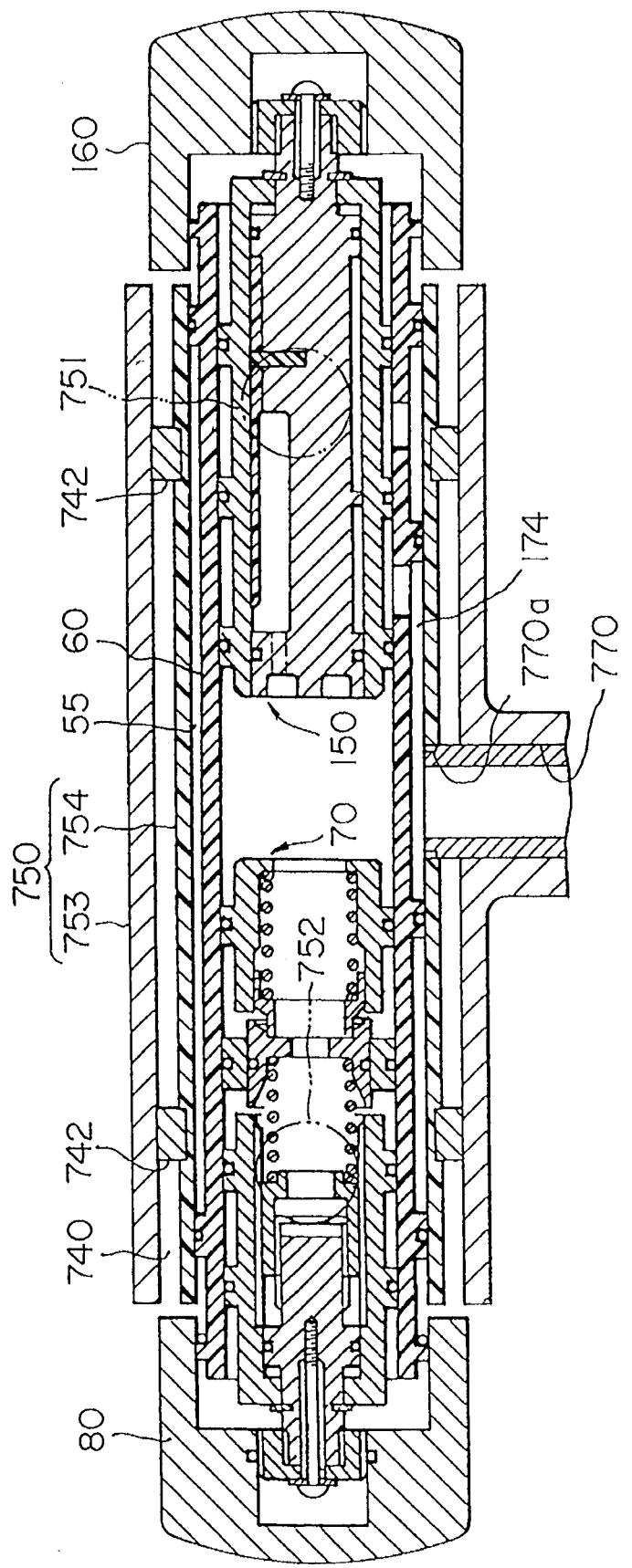
FIG. 18 is a sectional view showing a tenth embodiment of the invention.

FIG. 18 is a sectional view showing a tenth embodiment of the present invention.

In the present embodiment, the outer casing 750 comprises a tubular body 753 made of metal by casting and a further tubular body 754 made of resin fitted to the interior of the metal tubular body 753 with a radial gap 740 remaining therebetween. Fitting the resin tubular body 754 to the interior of the metal tubular body 753 is performed through elastic rings 742 made of elastic material such as rubber.

Namely, the resin tubular body 754 is mounted with the pair of elastic rings 742 being fitted on the outer periphery of the resin tubular body 754 near both ends thereof, and the metal tubular body 753 is mounted so as to compress the elastic rings 742.

In the resin tubular body 754 is disposed the inner casing 60 in which the mixing valve cartridge 70 and the change-over valve cartridge 150 are housed, similar to the above-described embodiment. The metal tubular body 753 is provided with an outer cold water inlet opening 751, an outer hot water inlet opening 752 and an outer mixed water outlet opening 770, and the resin tubular body 754 is provided with an inner cold water inlet opening, an inner hot water inlet opening and an inner mixed water outlet opening 770a, similar to the above-described embodiment.

With the present embodiment, since the metal tubular body 753 of the outer casing 750 is mounted on the resin tubular body 754 through the elastic ring 742, machining the metal tubular body 753 can be omitted; so the manufacturing process of the outer casing 750 can be simplified.

Moreover, provision of the gap 740 between the resin tubular body 754 and the metal tubular body 753 prevents the metal tubular body 753 from being heated to a high temperature, due to the thermal insulation effect of air. In addition, interposition of the elastic rings 742 enables the vibration such as pulsating or the like produced during use of the hot and cold water mixing device to be absorbed, thereby preventing an accident of damage due to the vibration of the fittings of the hot and cold water mixing device.

Figure 19:
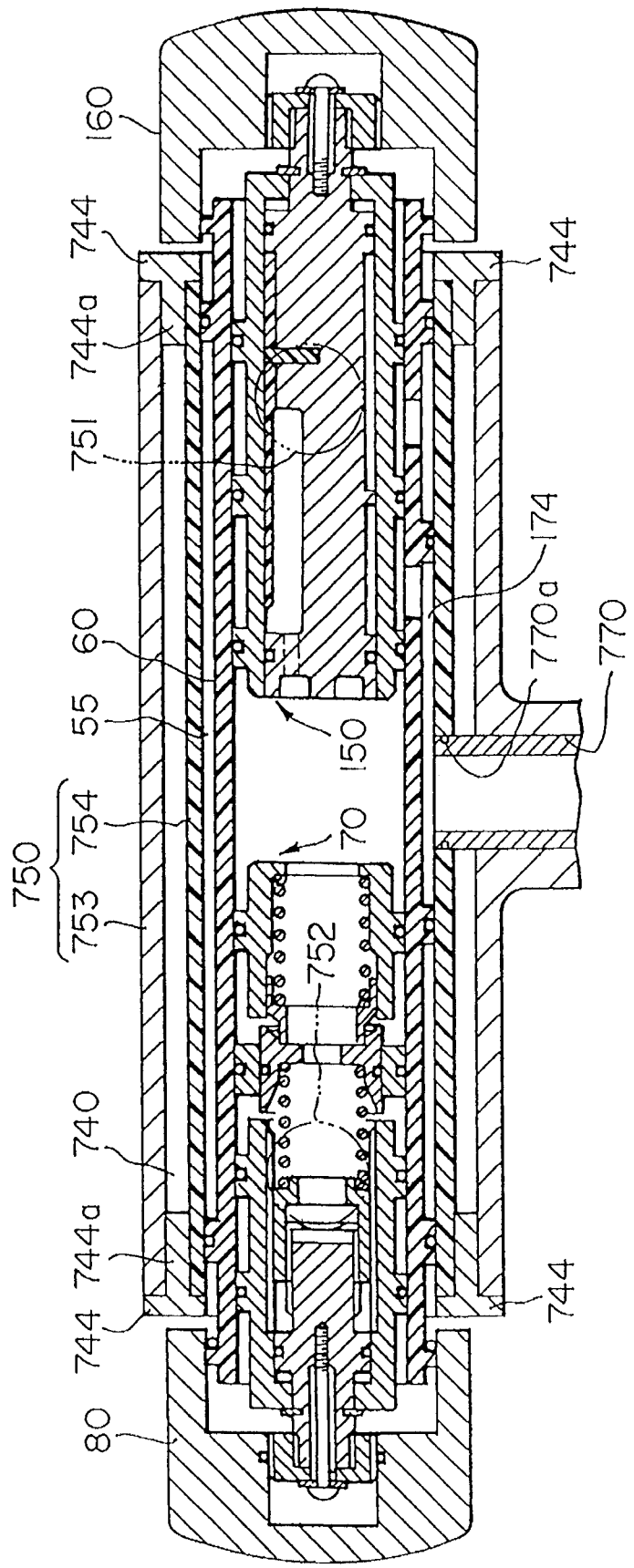
FIG. 19 is a sectional view showing an eleventh embodiment of the invention.

FIG. 19 is a sectional view showing an eleventh embodiment of the present invention. The present embodiment is a modification of the above-described tenth embodiment, wherein a metal tubular body 753 of the outer casing 750 is mounted on a resin tubular body 754 using elastic caps 744 in place of elastic rings.

Each of the elastic caps 744 is made of rubber, engineering plastics or the like, and has a tubular part 744a having a thickness larger than the gap 740. The metal tubular body 753 is mounted on the resin tubular body 754 by inserting the tubular body 744a into the gap 740 between the metal tubular body 753 and the resin tubular body 754 from both ends thereof.

With the present embodiment, interposition of the elastic rings such as in the above-described embodiment enables the outer casing 750 to be assembled simply.

Industrial Applicability

As explained above, since all or a portion of the outer casing is formed using resin material, machining the inner surface of the outer casing can largely be simplified, and simultaneously, building in the inner casing is easy, thereby allowing the manufacturing process of the hot and cold water mixing device to be shortened.

Besides, the simplification of the manufacturing process can be promoted while maintaining the external appearance of the metal castings.

Further, since the outer casing is constituted using resin material, a thermal insulation effect within the outer casing can be provided, thereby preventing the outer surface of the outer casing from being heated to a high temperature to cause an accident such as a scald.

In addition, use of resin material, intermediate member or the like for the outer casing enables the vibration, noise or the like produced during use of the hot and cold water mixing device to be decreased.

We claim:

1. A hot and cold water mixing device comprising:

an outer casing formed at least in part of resin material and having respective openings communicating with a hot water supply passage, a cold water supply passage and a mixed water delivery passage;

a hollow inner casing inserted into said outer casing with a radial gap remaining therebetween and formed with two primary water holes communicating with said hot water supply passage and said cold water supply passage, respectively, and with a secondary water hole communicating with said mixed water delivery passage, said water holes opening through the outer surface side of said inner casing;

separating members arranged in said gap and forming at least two primary water passages between said outer and inner casings, said passages communicating with a hot water supply source and a cold water supply source respectively; and a means for controlling the fluid flowing into and out of said inner casing through the respective water holes thereof, said control means being disposed within said inner casing and being of cartridge construction.

2. A hot and cold water mixing device as claimed in claim 1, wherein said outer casing is provided with insertion openings for inserting and disposing said inner casing in said outer casing from outside of said outer casing.

3. A hot and cold water mixing device as claimed in claim 2, wherein said insertion openings of said outer casing also serve as communicating holes for operating parts to operate said fluid control means.

4. A hot and cold water mixing device as claimed in claim 1, wherein said outer casing consists of a tubular body formed of synthetic resin material.

5. A hot and cold water mixing device as claimed in claim 4, wherein said outer casing is provided, on the inner peripheral surface thereof, with stepped portions the inner diameters of which become smaller from the lateral end portions inwardly in the axial direction.

6. A hot and cold water mixing device as claimed in claim 5, wherein said inner casing is divided into two parts in the axial direction, on the outer peripheral surface of which stepped portions corresponding to those of the inner peripheral surface of said outer casing are formed.

7. A hot and cold water mixing device as claimed in claim 6, wherein separating members for forming fluid passages are provided between the end surfaces of said stepped portions provided on the inner peripheral surface of said outer casing and the end surfaces of the stepped portions provided on the outer peripheral surface of said inner casing.

8. A hot and cold water mixing device as claimed in claim 1, wherein said outer casing comprises a tubular body made of metal and a resin layer coated on the inner peripheral surface of said tubular body.

9. A hot and cold water device as claimed in claim 1, wherein said outer casing comprising a tubular body made of metal and a further tubular body made of resin fitted to the interior of said tubular body.

10. A hot and cold water mixing device as claimed in claim 9, wherein said resin tubular body is fitted into said metal tubular body in engagement with the inner peripheral surface thereof.

11. A hot and cold water mixing device comprising:

an outer casing having respective openings communicating with a hot water supply passage, a cold water supply passage and a mixed water delivery passage;

a hollow inner casing inserted into said outer casing with a radial gap remaining therebetween and formed with two primary water holes communicating with said hot water supply passage and said cold water supply passage, respectively, and with a secondary water hole communicating with said mixed water delivery passage, said water holes opening through the outer surface side of said inner casing; and separating members for defining fluid passages within said gap between said outer and inner casings;

said outer casing comprising an outer tubular body made of metal and a further tubular body made of resin fitted to the interior of said outer tubular body with a gap remaining next to the inner surface of said outer tubular body.

12. A hot and cold water mixing device as claimed in claim 11, wherein said gap between said metal tubular body and said resin tubular body is filled with an intermediate member.

13. A hot and cold water mixing device as claimed in claim 12, wherein said intermediate member consists of an expandable bead.

14. A hot and cold water mixing device as claimed in claim 11, wherein weight balance adjusting members are disposed in the gap between said metal tubular body and said resin tubular body.

15. A hot and cold water mixing device as claimed in claim 11, wherein said resin tubular body is fitted to the interior of said metal tubular body through elastic rings.

16. A hot and cold water mixing device comprising:

an outer casing having respective openings communicating with a hot water supply passage, a cold water supply passage, and a mixed water delivery passage;

a hollow inner casing inserted into said outer casing with a radial gap remaining therebetween and formed with two primary water holes communicating with said hot water supply passage and said cold water supply passage, respectively, and with a secondary water hole communicating with said mixed water delivery passage, said water holes opening through the outer surface side of said inner casing; and separating members for defining fluid passages within said gap between said outer and inner casings;

said outer casing comprising a metal tubular body having two ends and a further resin tubular body having two ends and fitted to the interior of said metal tubular body through elastic rings mounted on the two ends of both said resin tubular body and said metal tubular body.

17. A hot and cold water mixing device comprising:

an outer casing having respective openings which communicate with a hot water supply passage, a cold water supply passage, and a mixed water delivery passage;

a hollow inner casing inserted into said outer casing with a radial gap remaining therebetween and formed with two primary water holes communicating with said hot water supply passage and said cold water supply passage, respectively, and with a secondary water hole communicating with said mixed water delivery passage, said water holes opening through the outer surface side of said inner casing; and separating members for defining fluid passages within said gap between said outer and inner casings;

said outer casing comprising a first tubular body made of resin, a second tubular body made of resin fitted to said first tubular body with a gap remaining radially from the inner surface of said first tubular body, and an intermediate member in said gap.

* * * * *